US008864456B2

(12) United States Patent
Beers et al.

(10) Patent No.: US 8,864,456 B2
(45) Date of Patent: *Oct. 21, 2014

(54) TURBINE NOZZLE FOR AIR CYCLE MACHINE

(75) Inventors: Craig M. Beers, Wethersfield, CT (US); Harold W. Hipsky, Willington, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 238 days.

This patent is subject to a terminal disclaimer.

(21) Appl. No.: 13/235,772

(22) Filed: Sep. 19, 2011

(65) Prior Publication Data

US 2013/0071239 A1 Mar. 21, 2013

(51) Int. Cl.

| | |
|---|---|
| ***F04D 29/54*** | (2006.01) |
| ***F01D 9/04*** | (2006.01) |
| ***F01D 5/14*** | (2006.01) |

(52) U.S. Cl.

CPC .............. *F01D 9/04* (2013.01); *F05D 2240/12* (2013.01); *Y02T 50/673* (2013.01); *F01D 5/141* (2013.01)

USPC ........................................ 415/191; 415/208.2

(58) Field of Classification Search

USPC ............. 415/191, 208.1, 208.2, 208.3, 209.4; 416/243, 223 R, 223 B

See application file for complete search history.

(56) References Cited

U.S. PATENT DOCUMENTS

| | | | | |
|---|---|---|---|---|
| 3,600,781 | A * | 8/1971 | Scott | 29/889.22 |
| 4,272,955 | A | 6/1981 | Hoffman et al. | |
| 4,521,155 | A | 6/1985 | Osborn | |
| 4,790,720 | A | 12/1988 | Rodgers | |
| 5,014,518 | A | 5/1991 | Thomson et al. | |
| 5,249,934 | A | 10/1993 | Merritt et al. | |
| 5,299,909 | A | 4/1994 | Wulf | |
| 6,036,438 | A | 3/2000 | Imai | |
| 6,398,489 | B1 | 6/2002 | Burdgick et al. | |
| 7,140,839 | B2 | 11/2006 | McAuliffe et al. | |
| 7,329,093 | B2 | 2/2008 | Vandeputte et al. | |
| 7,407,367 | B2 | 8/2008 | McAuliffe et al. | |
| 7,535,150 | B1 | 5/2009 | Wilson | |
| 2007/0134105 | A1* | 6/2007 | Beers et al. | 417/407 |

OTHER PUBLICATIONS

U.S. Appl. No. 12/974,159, filed Dec. 21, 2010 entitled "Turbine Nozzle for Air Cycle Machine".

Chinese Search Report dated May 5, 2014 for Application No. 201210348657.8, filed Sep. 19, 2012.

* cited by examiner

*Primary Examiner* — Edward Look
*Assistant Examiner* — Maxime Adjagbe
(74) *Attorney, Agent, or Firm* — Carlson, Gaskey & Olds, P.C.

(57) ABSTRACT

A turbine nozzle for an air cycle machine includes a base with a multiple turbine vanes which each extend for a vane height H, a throat width W defined between each of the multiple of turbine vanes, wherein a ratio W/H is 0.101-0.112.

12 Claims, 3 Drawing Sheets

10
12
14
16
18
20
22
24
26
27
28
30
32
33
34
35
36
38
40
42
A
11

TURBINE NOZZLE FOR AIR CYCLE MACHINE

BACKGROUND

The present disclosure relates to an air cycle machine, and more particularly, to an air cycle machine turbine nozzle.

An air cycle machine may include a centrifugal compressor and a turbine mounted for co-rotation on a shaft. Typically, the centrifugal compressor further compresses partially compressed air, such as bleed air received from a compressor of a gas turbine engine. In one example, the compressed air discharges to a downstream heat exchanger or other system before return to the centrifugal turbine. The compressed air expands in the turbine to thereby drive the compressor. The air output from the turbine may be utilized as an air supply system for a vehicle, such as the cabin of an aircraft.

SUMMARY

A turbine nozzle for an air cycle machine according to an exemplary aspect of the present disclosure includes a base with multiple turbine vanes that extend a vane height H from the base, a throat width W defined between each of the turbine vanes, wherein a ratio W/H is 0.101-0.112.

A turbine nozzle for an air cycle machine according to an exemplary aspect of the present disclosure includes a base with turbine vanes which extend therefrom, each of the turbine vanes have an airfoil profile section defined by a set of points in Table T-1 scaled by a desired factor, the set of points include paired chord and thickness dimensions.

An air cycle machine according to an exemplary aspect of the present disclosure includes a turbine nozzle with multiple turbine vanes, which each extend for a vane height H, a throat width W defined between each of the multiple of turbine vanes wherein a ratio W/H is 0.101-0.112.

A method of installing a turbine nozzle in an air cycle machine according to an exemplary aspect of the present disclosure includes mounting a turbine nozzle to at least partially define a turbine flowpath, the turbine nozzle having turbine vanes, a throat width W is defined between each of the turbine vanes and each of the turbine vanes define a vane height H, wherein a ratio W/H is 0.101-0.112.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
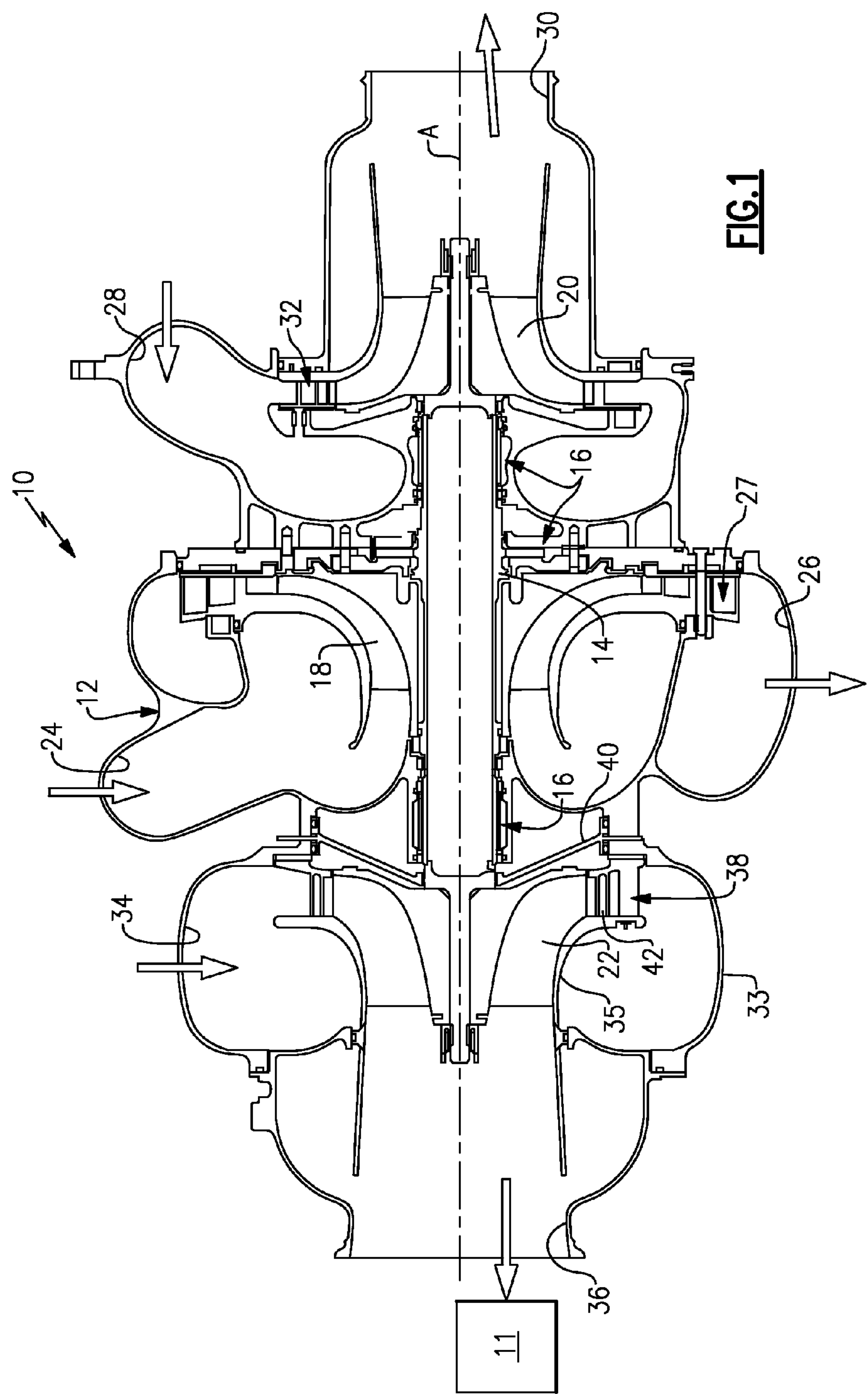
FIG. 1 illustrates a schematic sectional view of an example air cycle machine.

FIG. 1 schematically illustrates an example air cycle machine (ACM) 10 that is incorporated into an air supply system 11 of a vehicle, such as an aircraft, helicopter, or land-based vehicle. The ACM 10 includes a shaft 14 supported by bearings 16 within a housing 12. The housing 12 is typically constructed of multiple pieces secured to one another to facilitate assembly. A compressor rotor 18 and first and second turbine rotors 20, 22 are mounted on the shaft 14 for co-rotation about an axis A.

In the example ACM 10, the housing 12 provides a compressor inlet 24 and a compressor outlet 26. A compressor diffuser 27 is fluidly arranged between the compressor inlet 24 and the compressor outlet 26. Compressed air from the compressor outlet 26 is received by a first turbine inlet 28 and passed through a first turbine nozzle 32 before being expanded over the first turbine rotor 20. The expanded fluid exits a first turbine outlet 30 and is routed to a second turbine inlet 34. Fluid passes through a second turbine nozzle 38 and is expanded over the second turbine rotor 22. A seal plate 40 separates a bearing compartment and the second turbine rotor 22. Expanded fluid is supplied by a second turbine outlet 36 to the air supply system 11.

The fluid connections and flow between the compressor and turbine sections are not shown for clarity and are illustrated schematically by arrows respectively into and out of the inlets and outlets. The second turbine nozzle 38 is retained between a second turbine inlet housing 33 and a turbine shroud 35, which define a flow path between the second turbine inlet and outlet 34, 36.

Figure 2A:
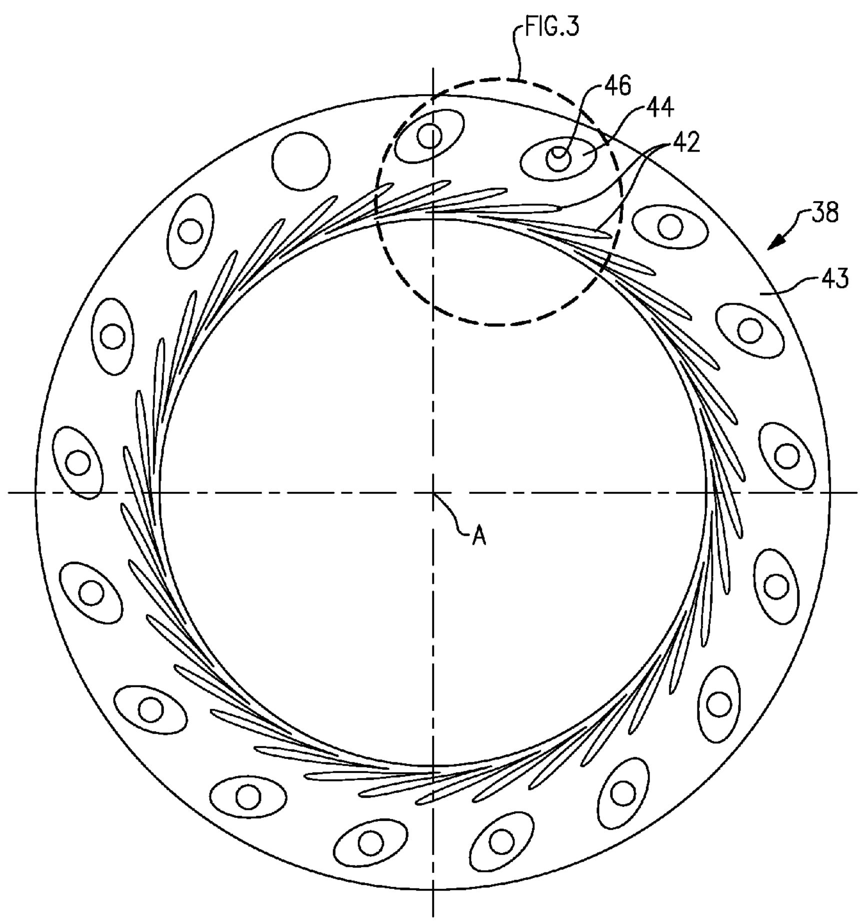
FIG. 2A illustrates a first side view of a turbine nozzle.
Figure 2B:
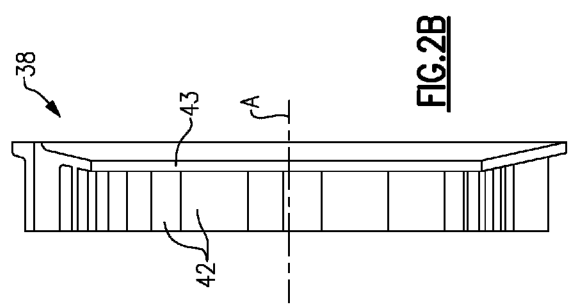
FIG. 2B illustrates a second side view of the turbine nozzle.
Figure 3:
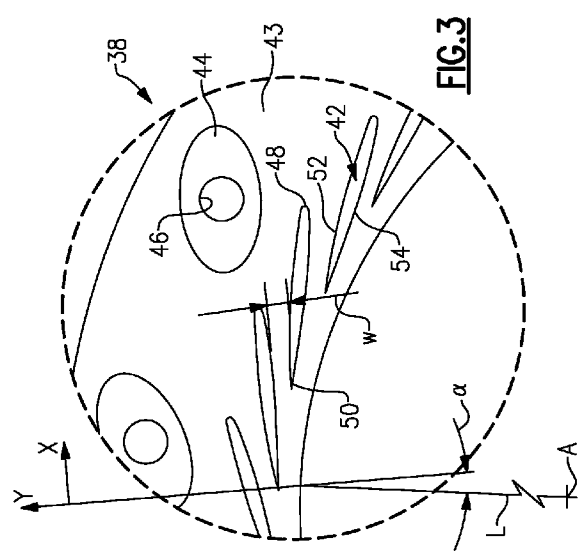
FIG. 3 is an expanded view of a turbine vane of the turbine nozzle.
Figure 4:
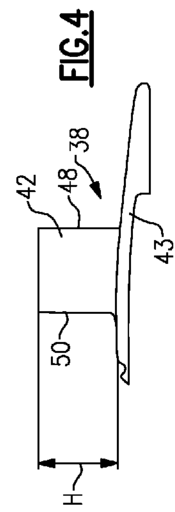
FIG. 4 is an enlarged side view of a turbine vane of the turbine nozzle.

With reference to FIGS. 2A-4, the second turbine nozzle 38 generally includes a base 43 defined about the central axis A and circumferentially arranged turbine vanes 42 which extend axially along the central axis A. In one non-limiting embodiment, thirty-four turbine vanes 42 are provided. The turbine vanes 42 are located upstream from the second turbine rotor 22 (FIG. 1). Multiple bosses 44 extend from the base 43 and include apertures 46 to receive fasteners (not shown) for securing the inlet housing 33, the turbine shroud 35 and the second turbine nozzle 38 to one another, as shown in FIG. 1. As depicted in FIGS. 2A and 3, the bosses 44 and apertures 46 are separate and independent from vanes 42.

The turbine vanes 42 are designed to provide desired airfoil characteristics. Characteristics of the airfoil include, but are not limited to, curvature, maximum thickness, axial chord length, twist, taper from root to tip, radius of the leading edge, radius of the trailing edge, straightness of the leading and trailing edge from root to tip, etc. It is possible to directly scale up or scale down the airfoil shape to meet different requirements.

Each turbine vane 42 includes a leading edge 48 and a trailing edge 50 which define the chord of the vane 42. A pressure side 52 and a suction side 54 extend between the leading edge 48 and the trailing edge 50. In one disclosed non-limiting dimensional embodiment, a throat width W between each adjacent vane 42 is 0.1110-0.1210 inches (2.82-3.07 mm). Each vane 42 also defines a vane height dimension H which, in one disclosed non-limiting dimensional embodiment, is 1.084-1.096 inches (27.53-27.84 mm). In this disclosed non-limiting dimensional embodiment, a ratio W/H is 0.101-0.112. Such a relationship facilitates desired flow control characteristics into the second turbine rotor 22.

With reference to FIG. 3, because of the difficulty involved in giving an adequate word description of the particular profile of each turbine vane 52 being described herein, coordinates for one non-limiting dimensional embodiment therefore are set forth in Vane Contour Table T-1. The 0,0 X,Y coordinate corresponds to the trailing edge.

TABLE T-1

| VANE CONTOUR 34x | |
|---|---|
| DIM X BSC | DIM Y BSC |
| 0.0000 | 0.0000 |
| 0.1000 | 0.0000 |
| 0.2000 | 0.0000 |
| 0.3000 | 0.0000 |
| 0.4000 | 0.0000 |
| 0.5000 | 0.0000 |
| 0.6000 | 0.0000 |
| 0.7240 | 0.0000 |
| 0.8135 | 0.0067 |
| 0.9035 | 0.0167 |
| 1.1647 | 0.0507 |
| 1.1752 | 0.0561 |
| 1.1822 | 0.0660 |
| 1.1839 | 0.0750 |
| 1.1832 | 0.0807 |
| 1.1792 | 0.0895 |
| 1.1706 | 0.0971 |
| 1.1589 | 0.1000 |
| 1.0862 | 0.1000 |
| 1.0122 | 0.1000 |
| 0.9378 | 0.1000 |
| 0.8947 | 0.1000 |
| 0.8000 | 0.0986 |
| 0.7100 | 0.0952 |
| 0.6200 | 0.0898 |
| 0.5300 | 0.0823 |
| 0.4400 | 0.0728 |
| 0.3500 | 0.0612 |
| 0.2600 | 0.0476 |
| 0.1706 | 0.0319 |
| 0.0850 | 0.0159 |
| 0.0000 | 0.0000 |

Each turbine vane 42 is dimensionally defined by a paired chord dimension X and a thickness dimension Y based from the trailing edge 50. Chord dimension X is perpendicular to the thickness dimension Y. Chord dimension X has a slight angular offset alpha from a line L which extends radially from centerline A to the trailing edge 50. Offset alpha, in one non-limiting dimensional embodiment, is about 5.1 degrees. The paired dimensions X, Y are provided in Table T-1 to define the profile of each turbine vane 38 along the span thereof.

Table values are shown to four decimal places. However, in view of manufacturing constraints, actual values useful for manufacture of the component are considered to be within the indicated values to determine the claimed profile of the component. That is, there are typical manufacturing tolerances which must be accounted for in the profile of the component. Accordingly, the values for the profile given in the disclosed Table are for a nominal component. It will therefore be appreciated that plus or minus typical manufacturing tolerances are applicable to the table values and that a component having a profile substantially in accordance with those values includes such tolerances. For example, a manufacturing tolerance of about +/−0.03 inches (0.76 mm) should be considered within design limits for the component. Thus, the mechanical and aerodynamic function of the components is not impaired by manufacturing imperfections and tolerances, which in different embodiments may be greater or lesser than the values set forth in the disclosed Table. As appreciated by those in the art, manufacturing tolerances may be determined to achieve a desired mean and standard deviation of manufactured components in relation to the ideal component profile points set forth in the disclosed Table.

In addition, the component may also be coated for protection against corrosion and oxidation after the component is manufactured, according to the values of the Table and within the tolerances explained above. Consequently, in addition to the manufacturing tolerances for the values set forth in the Table, there may also be an addition to those values to account for the coating thicknesses. It is contemplated that greater or lesser coating thickness values may be employed in alternative embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the disclosed embodiment.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosed embodiment may be practiced other than as specifically described. For that reason the appended claims should be studied to determine true scope and content.

What is claimed:

1. A turbine nozzle for an air cycle machine comprising:

a base with a multiple of turbine vanes which extend for a vane height H relative said base, a throat width W defined between each of said multiple of turbine vanes, where a ratio W/H is 0.101-0.112, wherein each of said multiple of turbine vanes have an airfoil profile section defined by a set of points in Table T-1 scaled by a desired factor, said set of points include paired chord and thickness dimensions.

2. The turbine nozzle as recited in claim 1, wherein said paired chord and thickness dimensions originate from a trailing edge.

3. A turbine nozzle for an air cycle machine comprising:

a base with a multiple turbine vanes which extend therefrom, each of said multiple of turbine vanes have an airfoil profile section defined by a set of points in Table T-1 scaled by a desired factor, said set of points include paired chord and thickness dimensions.

4. The turbine nozzle as recited in claim 3, wherein a throat width W is defined between each of said multiple of turbine vanes and each of said multiple of turbine vanes define a vane height H relative said base where a ratio W/H is 0.101-0.112.

5. The turbine nozzle as recited in claim 3, wherein said airfoil profile section defined by a set of points in Table T-1 is adjusted by a manufacturing tolerance.

6. The turbine nozzle as recited in claim 5, wherein said manufacturing tolerance is about +/−0.03 inches.

7. An air cycle machine comprising:

a compressor section;

a fan section; and a turbine section axially between said fan section and said compressor section, said turbine section includes a turbine nozzle with a multiple turbine vanes which each extend for a vane height H, a throat width W defined between each of said multiple of turbine vanes wherein a ratio W/H is 0.101-0.112, wherein each of said multiple of turbine vanes have an airfoil profile section defined by a set of points in Table T-1 scaled by a desired factor, said set of points include paired chord and thickness dimensions.

8. The air cycle machine as recited in claim 7, wherein said paired chord and thickness dimensions originate from a trailing edge.

9. The air cycle machine as recited in claim 7, further comprising a turbine shroud downstream of said turbine nozzle.

10. A method of installing a turbine nozzle in an air cycle machine, comprising:

mounting a turbine nozzle to at least partially define a turbine flowpath, the turbine nozzle having a multiple turbine vanes which each extend for a vane height H, a throat width W defined between each of said multiple of turbine vanes wherein a ratio W/H is 0.101-0.112, wherein each of said multiple of turbine vanes have an airfoil profile section defined by a set of points in Table T-1 scaled by a desired factor, said set of points include paired chord and thickness dimensions.

11. The method as recited in claim 10, further comprising:

mounting a turbine shroud downstream of the turbine nozzle.

12. The method as recited in claim 11, further comprising:

mounting a turbine rotor downstream of the turbine nozzle and within the turbine shroud.

* * * * *